US005279122A

United States Patent [19]

Shirai et al.

[11] Patent Number: 5,279,122

[45] Date of Patent: Jan. 18, 1994

[54] HYDRAULIC CIRCUIT APPARATUS FOR SUPPLYING FLUID UNDER PRESSURE INTO HYDRAULIC CYLINDERS FOR WORK IMPLEMENT

[75] Inventors: Kiyoshi Shirai; Teruo Akiyama; Shigeru Shinohara; Naoki Ishizaki; Takahide Takiguchi, all of Kawasaki, Japan

[73] Assignee: Kabushiki Kaisha Komatsu Seisakusho, Tokyo, Japan

[21] Appl. No.: 38,189

[22] Filed: Mar. 29, 1993

Related U.S. Application Data

[63] Continuation of Ser. No. 651,268, filed as PCT/JP90/01050, on Aug. 16, 1990, abandoned.

[30] Foreign Application Priority Data

Aug. 16, 1989 [JP] Japan .................................. 1-210053

[51] Int. Cl.[5] .............................................. F16D 31/02

[52] U.S. Cl. ........................................ 60/452; 91/444; 91/531

[58] Field of Search ................. 60/445, 452, 459, 465, 60/484, 420, 422, 431; 91/444, 530, 531, 517, 459, 461

[56] References Cited

U.S. PATENT DOCUMENTS

| | | | |
|---|---|---|---|
| 3,834,836 | 9/1974 | Hein et al. | 60/445 X |
| 3,999,387 | 12/1976 | Knopf | 60/465 X |
| 4,118,149 | 10/1978 | Hagberg | 60/431 X |
| 4,355,510 | 10/1982 | Ruseff | 60/452 |
| 4,510,750 | 4/1985 | Izumi et al. | 60/452 X |
| 4,518,321 | 5/1985 | Schniederjan | 60/452 X |
| 4,617,854 | 10/1986 | Kropp | 91/531 X |
| 4,694,647 | 9/1987 | Yoshida | 91/461 X |
| 4,727,791 | 3/1988 | Satoh | 91/459 X |
| 5,085,051 | 2/1992 | Hirata | 60/452 X |
| 5,148,676 | 9/1992 | Moriya et al. | 60/422 X |
| 5,209,063 | 5/1993 | Shirai et al. | 60/422 |

FOREIGN PATENT DOCUMENTS

| | | | |
|---|---|---|---|
| 3713824 | 11/1988 | Fed. Rep. of Germany . | |
| 0167501 | 10/1982 | Japan | 60/445 |
| 59-69505 | 4/1984 | Japan . | |

*Primary Examiner*—Edward K. Look
*Assistant Examiner*—Hoang Nguyen
*Attorney, Agent, or Firm*—Armstrong, Westerman, Hattori, McLeland & Naughton

[57] ABSTRACT

This invention aims at providing a hydraulic circuit apparatus for supplying pressurized fluid into cylinders for a work implement arranged such that during normal operation of the work implement the flow rate of fluid discharged by a pump is controlled such that the difference between the discharge pressure of the pump and the load pressure is always kept constant, whilst during inching operation of the work implement the flow rate of fluid discharged by the pump is reduced. This circuit apparatus comprises a large diameter piston (9) for actuating a displacement regulating member (8) of a variable displacement pump (2) in a direction as to reduce the displacement of the pump; a small diameter piston (10) having pressure receiving chamber (10*a*) connected with discharge passage (2*a*) of the pump and adapted to actuate discharge regulating member (8) in a direction as to increase the displacement of the pump (2); a load sensing valve (11) for connecting or disconnecting pressure receiving chamber (9*a*) of the large piston (9) with or from the discharge passage; and apparatus (12, 13, 14) for applying a force to the load sensing valve to push its spool in a direction as to communicate the discharge passage (2*a*) of the pump with pressure receiving chamber (9*a*) of the large piston.

8 Claims, 2 Drawing Sheets

FIG.1
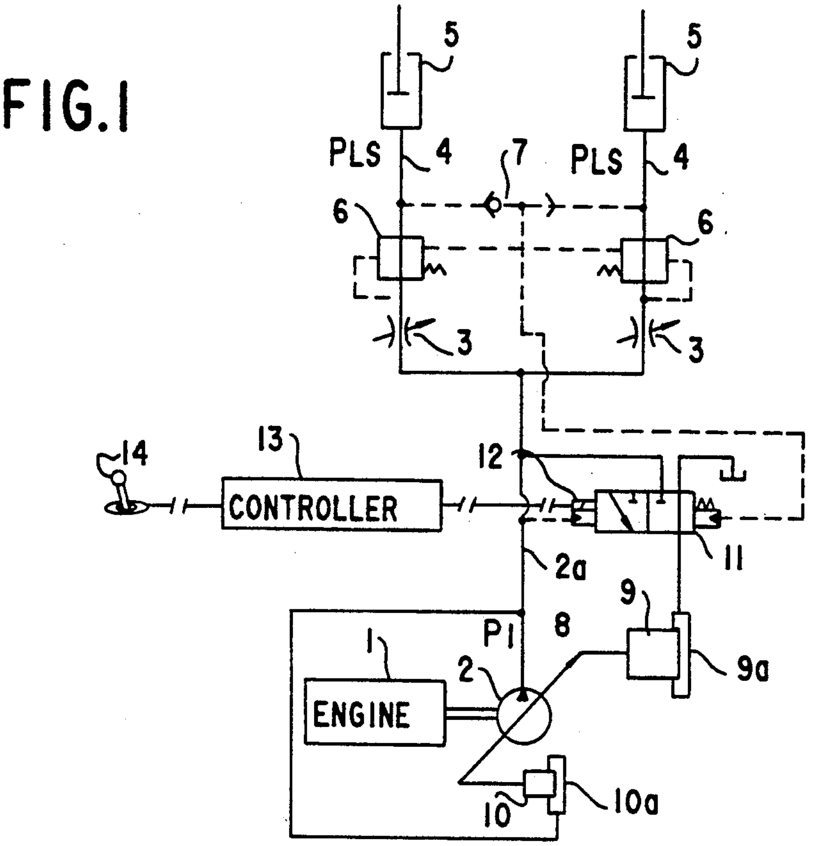
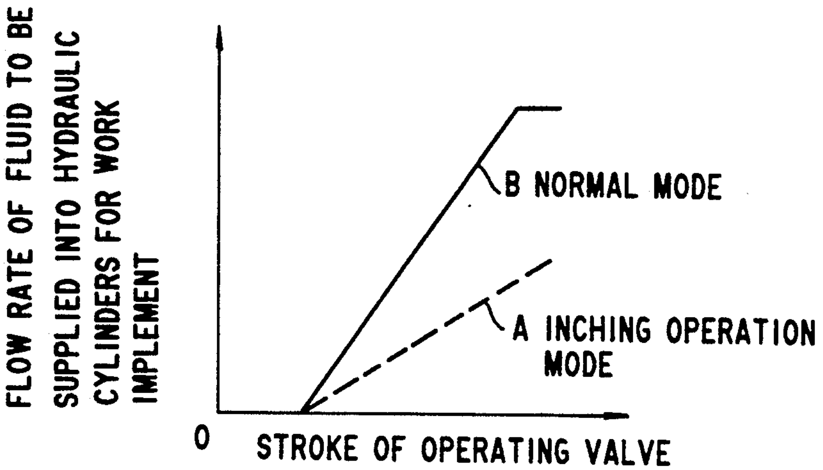
FIG.2

HYDRAULIC CIRCUIT APPARATUS FOR SUPPLYING FLUID UNDER PRESSURE INTO HYDRAULIC CYLINDERS FOR WORK IMPLEMENT

This application is a continuation of application Ser. No. 07/651,268, filed as PCT/JP90/01050, on Aug. 16, 1990, now abandoned.

TECHNICAL FIELD OF THE INVENTION

This invention relates to a hydraulic circuit apparatus for supplying fluid under pressure discharged by a hydraulic pump into hydraulic cylinders for actuating a work implement of a construction vehicle such as a power shovel or the like.

BACKGROUND ART OF THE INVENTION

A hydraulic circuit apparatus arranged so as to supply fluid under pressure discharged by a hydraulic pump into hydraulic cylinders for a work implement through operating valves is heretofore well known.

In case of conducting earth scraping-off operation and slope correcting operation by a power shovel, it is necessary to perform an inching operation of the work implement of the power shovel. This inching operation of the work implement is achieved by supplying extremely small amounts of fluid under pressure discharged by a hydraulic pump into hydraulic cylinders for the work implement.

In pressurized fluid supplying apparatus circuits of the prior art, in order, to control the amount of fluid under pressure to be supplied into hydraulic cylinders for the work implement, the area of opening between the pump port and the outlet port is precisely controlled by minimizing the operational stroke of operating valves. However, it is impossible to precisely control finely the amount of fluid under pressure to be supplied into the hydraulic cylinders for the work implement only by precisely controlling the area of opening. It is also impossible to inch the work implement as desired, and as a result, the operational accuracy in earth scraping-off operations and slope correcting operations is diminished.

SUMMARY OF THE INVENTION

An object of the present invention is to provide a hydraulic circuit apparatus for supplying fluid under pressure into hydraulic cylinders for a work implement wherein during normal operation of the work implement the flow rate of fluid under pressure discharged by a hydraulic pump is controlled in such a manner that the difference between the discharge pressure of the pump and the load pressure is always kept constant, reducing the flow rate of fluid discharged by the pump during inching operation of the work implement.

To achieve the above-mentioned object, according to a first aspect of the present invention, a hydraulic circuit apparatus is provided for supplying fluid under pressure into hydraulic cylinders for a work cylinder arranged so as to connect a discharge passage of a variable displacement pump through operating valves with the cylinders for the work implement. A large diameter piston for actuates a displacement regulating member of the variable displacement pump in such a direction as to reduce the displacement of the pump. A small diameter piston has a pressure receiving chamber connected with the discharge passage of the pump and is adapted to actuate the displacement regulating member of the pump in such a direction as to increase the displacement of the pump. A load sensing valve connects or disconnects the pressure receiving chamber of the large diameter piston with or from the discharge passage of the pump. A means for applying pushing forces to the load sensing valve pushes its spool in such a direction as to communicate the discharge passage of the pump with the pressure receiving chamber of the large diameter piston, wherein during normal operation of the work implement the flow rate of fluid discharged by the pump is controlled in such a manner that the difference between the discharge pressure of the pump and the load pressure is always kept constant, whilst during inching operation of the work implement the flow rate of fluid discharged by the pump is reduced.

According to a second aspect of the present invention, a hydraulic circuit apparatus supplies fluid under pressure into hydraulic cylinders for a work implement, as set forth in the first aspect of the invention, wherein the pushing force applying means comprises: a proportional position action electromagnetic solenoid provided on one side of the load sensing valve; a mode change-over switch for the electromagnetic solenoid; and a controller adapted to receive an inching operation mode signal transmitted by the mode change-over switch and to send an electric current to the electromagnetic solenoid.

Further, according to a third aspect of the present invention, a hydraulic circuit apparatus supplies fluid under pressure into hydraulic cylinders for a work implement as set forth in the first aspect of the invention, wherein the pushing force applying means comprises: a pilot pump; a conduit for introducing pilot fluid under pressure discharged by the pilot pump into a pressure receiving section provided on one side of the load sensing valve; a change-over valve provided in the conduit; a proportional position action electromagnetic solenoid provided on one side of the change-over valve; a mode change-over switch for the electromagnetic solenoid; and a controller adapted to receive an inching operation mode signal transmitted by the mode change-over switch and to send an electric current to the electromagnetic solenoid.

According to the present invention, since the flow rate of fluid discharged by the variable displacement pump is controlled in such a manner that the difference between the discharge pressure of the pump and the load pressure is always kept constant, a stable operation of the work implement is ensured. During and also during inching operation of the work implement the displacement regulating member of the variable displacement member of the variable displacement pump can be actuated in such a direction as to reduce the displacement of the pump by applying pushing forces to the load sensing valve so as to push its spool in such a direction as to communicate the discharge passage of the pump with the pressure receiving chamber of the large diameter piston. Accordingly, since during inching operation of the work implement the flow rate of fluid discharged by the variable displacement pump can be reduced, the amount of fluid under pressure to be supplied into the hydraulic cylinders for the work implement can be controlled precisely so that the inching operational characteristic can be enhanced.

The above-mentioned and other objects, aspects and advantages of the present invention will become apparent to those skilled in the art when reference is made to the following description and the accompanying drawings in which preferred embodiments incorporating the principles of the present invention are shown by way of example only.

BRIEF DESCRIPTION OF THE DRAWINGS

FIG. 1 is a hydraulic circuit diagram showing a first embodiment of the present invention;

FIG. 2 is a graph showing the relationship between the flow rate of fluid under pressure supplied into hydraulic cylinders for a work implement and the stroke of an operating valve associated therewith.

DETAILED DESCRIPTION OF PREFERRED EMBODIMENTS

Figure 3:
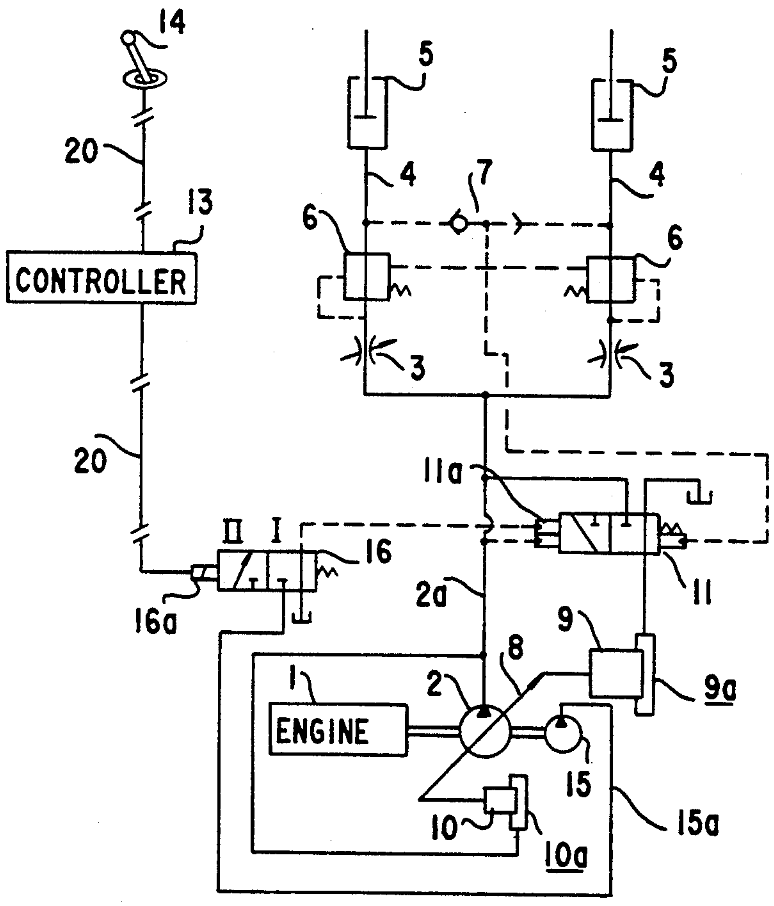
FIG. 3 is a hydraulic circuit diagram showing a second embodiment of the present invention.

The present invention will now be described in detail below by way of several preferred embodiments thereof with reference to the accompanying drawings.

Referring first to FIGS. 1 and 2, the first embodiment of the present invention is described.

A variable displacement pump 2 driven by an engine 1 has a discharge passage 2*a* connected with inlets of a plurality of operating valves 3, whose outlet sides are connected by their respective conduits 4 with hydraulic cylinders 5 of work implements, respectively. Each conduit 4 is provided with a pressure compensating valve 6. The load pressures $P_{LS}$ in the conduits 4 are compared by a shuttle valve 7, and a higher load pressure $P_{LS}$ detected as a result of the comparison is introduced into spring chambers of the pressure compensating valves 6 so that the valves 6 may be set at a pressure corresponding to the higher load pressure $P_{LS}$.

By so doing, the fluid under pressure discharged by one variable displacement pump 2 can be supplied to the hydraulic cylinders 5 for work implement.

The displacement of fluid from the variable displacement pump 2 is controlled so that the difference between the discharge pressure $P_1$ and the load pressure $P_{LS}$ is always kept constant.

Stating more specifically, a displacement regulating member 8 of the variable displacement pump 2 is actuated by a large piston 9 in such a direction as to reduce the displacement, and by a small piston 10 in such a direction as to increase the displacement. Further, a pressure receiving chamber 9*a* of the large piston 9 is controlled to be selectively connected through a load sensing valve 11 either with a fluid tank or with the discharge passage 2*a*, and a pressure receiving chamber 10*a* of the small piston 10 is connected with the discharge passage 2*a*.

The above-mentioned load sensing valve 11 has a spool arranged to be pushed by the pressure in the discharge passage 2*a*; that is, the discharge pressure $P_1$ and the thrust created by a proportional position action electromagnetic solenoid 12 is in such a direction as to increase the area of its port communicating with the pressure receiving chamber 9*a* of the large piston 9. The spool is also pushed by the outlet pressure in the operating valves 3; that is, the load pressure $P_{LS}$ is in such a direction as to reduce the area of the port thereof communicating with the pressure receiving chamber 9*a*. This load sensing valve 11 is arranged to effect control such that where the thrust created by the proportional position action electromagnetic solenoid 12 is zero, and when the difference between the discharge pressure $P_1$ and the load pressure $P_{LS}$ ($P_1-P_{LS}$) is increased, the pressure in the pressure receiving chamber 9*a* of the large piston 9 is increased so as to actuate the displacement regulating member 8 in such a direction as to reduce the displacement to thereby reduce the discharge flow rate per one revolution to reduce the discharge pressure $P_1$. When the thrust created by the solenoid 12 is zero, and when the difference between the discharge pressure $P_1$ and the load pressure $P_{LS}$ ($P_1-P_{LS}$) is reduced, the pressure in the pressure receiving chamber 9*a* of the large piston 9 is reduced so as to actuate the displacement regulating member 8 in such a direction as to increase the displacement to thereby increase the discharge flow rate per one revolution to increase the discharge pressure $P_1$, whereby controlling the displacement of fluid from the variable displacement pump 2 so that the difference between the discharge pressure $P_1$ and the load pressure $P_{LS}$ ($P_1-P_{LS}$) may always be kept constant. Further, when a thrust is created by the proportion position action electromagnetic solenoid 12, the spool of the load sensing valve 11 is pushed in such a direction as to increase the area of the port thereof communicating with the pressure receiving chamber 9*a* so as to increase the pressure in the chamber 9*a* of the large piston 9 regardless of the pressure between the discharge pressure $P_1$ and the load pressure $P_{LS}$ to move the displacement regulating member 8 in a direction to reduce the displacement, thereby reducing the flow rate of fluid per one revolution.

Stated in brief, the difference between the discharge pressure $P_1$ and the load pressure $P_{LS}$ is reduced by the thrust created by the proportional position action solenoid 12 so as to reduce the discharge flow rate of fluid from the variable displacement pump 12.

The above-mentioned proportional position action electromagnetic solenoid 12 is supplied with electric current from a controller 13, to which a mode signal from a mode change-over switch 14 is inputted. Whenever a normal mode signal is inputted by the mode change-over switch 14 to the controller 13, the proportional position action electromagnetic solenoid 12 is not supplied with electric current. Whenever an inching operation mode signal is inputted by the mode change-over switch 14 to the controller 13, the electromagnetic solenoid 12 is supplied with electric current.

In this arrangement, during inching of the work implement, the flow rate of fluid discharged by the variable displacement pump 2 becomes less than that in the normal operation, so that the flow rate of fluid to be supplied into the hydraulic cylinders 5 for work implement changes in proportion to the stroke of the operating valves 3, as shown by a dotted line "A" in FIG. 2, and becomes less than the flow rate of fluid in the normal operation as shown by a solid line B in FIG. 2, thus rendering it possible to effect precise control of the amount of fluid supplied into the hydraulic cylinders 5 for the work implement to improve the inching operation characteristic.

FIG. 3 illustrates the second embodiment of the present invention. In this embodiment, a pilot pump 15 is driven by an engine 1, and a discharge passage 15*a* of the pump 15 is connected through a change-over valve 16 with a pressure receiving section 11*a* of a load sensing valve 11. The change-over valve 16 is arranged to be kept at its shut-off position I by the resilient force of a spring mounted therein, and also kept at its communicating position II when its solenoid 16 is energized. The solenoid 16 is supplied with electric current from a power supply through a mode change-over switch 14 and the controller 13 via electrical control lines 20. The other elements of FIG. 3 are previously identified in the above description of the first embodiment of the present invention.

In the second embodiment a shown in FIG. 3, when a mode change-over switch 14 is located at its inching operation mode position so as to input an inching operation mode signal from the switch 14 to a controller 13 and send an electric current to a solenoid 16*a*, thereby energizing the same, a change-over valve 16 is changed over to its communicating position II so that the pilot fluid under pressure from a pilot pump 15 is supplied into a pressure receiving section 11*a* of a load sensing valve 11, and as a result, its spool is pushed in such a direction so as to increase the area of the port thereof communicating with pressure receiving chamber 9*a* of a large piston 9, thereby reducing the amount of fluid discharged by a variable displacement pump 2.

What is claimed is:

1. A hydraulic circuit apparatus for supplying fluid under pressure into a plurality of hydraulic cylinders for a work implement, each cylinder having a different load pressure, arranged so as to connect a discharge passage of a variable displacement pump through operating valves with the cylinders for the work implement, said apparatus comprising:

- a large diameter piston for actuating a displacement regulating member of said variable displacement pump in such a direction as to reduce the displacement of the pump;
- a small diameter piston having a pressure receiving chamber connected with said discharge passage of the pump for actuating the displacement regulating member of said pump in such a direction as to increase the displacement of the pump;
- a load sensing valve for connecting or disconnecting the pressure receiving chamber of said large diameter piston with or from the discharge passage of said pump; and
- means for applying pushing forces to the load sensing valve for pushing its spool in such a direction as to selectively establish and block communication of the discharge passage of said pump with the pressure receiving chamber of said large diameter piston; and
- wherein during normal operation of the work implement the flow rate of fluid discharged by the pump is controlled depending upon a pressure difference at said load sensing valve in such a manner that the difference between the discharge pressure of the pump and the highest of the load pressures from said plurality of hydraulic cylinders is always kept constant, while during inching operation of the work implement the flow rate of fluid discharged by the pump is reduced.

2. A hydraulic circuit apparatus for supplying fluid under pressure into hydraulic cylinders for a work implement as claimed in claim 1, wherein said pushing force applying means comprises: a proportional position action electromagnetic solenoid provided on one side of said load sensing valve; a mode change-over switch for the electromagnetic solenoid; and a controller for receiving an inching operation mode signal transmitted by the mode change-over switch and send an electric current to said electromagnetic solenoid.

3. A hydraulic circuit apparatus for supplying fluid under pressure into hydraulic cylinders for a work implement as claimed in claim 1, wherein said pushing force applying means comprises: a pilot pump; a conduit for introducing pilot fluid under pressure discharged by the pilot pump into a pressure receiving section provided on one side of said load sensing valve; a change-over valve provided in the conduit; a proportional position action electromagnetic solenoid provided on one side of the change-over valve; a mode change-over switch for the electromagnetic solenoid; and a controller for receiving an inching operation mode signal transmitted by the mode change-over switch and send an electric current to said electromagnetic solenoid.

4. A hydraulic circuit apparatus for supplying fluid under pressure into a plurality of hydraulic cylinders for a work implement, each cylinder having a different load pressure, arranged so as to connect a discharge passage of a variable displacement pump through operating valves with the cylinders for the work implement, said apparatus comprising:

- a variable displacement pump connected to said hydraulic cylinders for supplying pressurized working fluid thereto;
- a displacement adjusting means cooperating with said variable displacement pump for adjusting displacement of said pump;
- a valve means disposed between said variable displacement pump and said hydraulic cylinders for regulating a pressure difference at the pump side connected to said variable displacement pump and the load side connected to said hydraulic cylinders, said valve means including a valve member responsive to hydraulic pressures at said pump and load sides;
- means for cooperating said displacement adjusting means with said valve member for operating said displacement adjusting means depending upon the position of said valve member for maintaining said valve member at a predetermined neutral position where a predetermined pressure difference between said pump side and load side is established; and
- an electrically operated actuator means cooperating with said valve member and responsive to an electric command for inching operating of said work implement, for forcedly shifting said valve to a predetermined shift position for operating said displacement adjusting means via said cooperating means to reduce displacement of said variable displacement pump irrespective of the pressure difference between said pump and load sides for reducing discharge of said pump.

5. A hydraulic circuit apparatus as set forth in claim 4, wherein said valve member comprises a first valve component responsive to said hydraulic pressure at said pump side and a second valve component responsive to said hydraulic pressure at said load side, said first valve component being active at one end of said cooperating means for driving said cooperating means in a first direction in response to increasing of the hydraulic pressure at said pump side for reducing displacement of said variable displacement pump and said second valve component being active at the other end of said cooperating means for driving said cooperating means in a second direction opposite to said first direction in response to increasing of said hydraulic pressure at said load side for increasing the displacement of said variable displacement pump.

6. A hydraulic circuit apparatus for supplying fluid under pressure into a plurality of hydraulic cylinders for a work implement, each cylinder having a different load pressure, arranged so as to connect a discharge passage of a variable displacement pump through operating valves with the cylinders for the work implement, said apparatus comprising:

a variable displacement pump connected to said hydraulic cylinders for supplying pressurized working fluid thereto;

a displacement adjusting means cooperating with said variable displacement pump for adjusting displacement of said pump;

a valve means disposed between said variable displacement pump and said hydraulic cylinders for regulating a pressure difference at the pump side connected to said variable displacement pump and the load side connected to said hydraulic cylinders, said valve means including a valve member responsive to hydraulic pressures at said pump and load sides and having a force balance established between the pump side and the load side at a predetermined pressure difference between the hydraulic pressure at said pump side and the hydraulic pressure at said load side;

means for cooperating said displacement adjusting means with said valve member for operating said displacement adjusting means depending upon the position of said valve member for maintaining said valve member at a predetermined neutral position where a predetermined pressure difference between said pump side and load side is established; and an electrically operated actuator means cooperating with said valve member and responsive to an electric command for inching operation of said work implement, for forcedly shifting said valve to a predetermined shift position with an actuation force active for nominally reducing the pressure difference between said pump side and load side for operating said displacement adjusting means via said cooperating means to reduce displacement of said variable displacement pump irrespective of the pressure difference between said pump and load sides.

7. A hydraulic circuit system including a variable displacement pump means for discharging controlled displacement of working fluid through a discharge passage terminating at a plurality of hydraulic loads for work, a pressure controlling arrangement for adjusting hydraulic pressure at said hydraulic loads comprising:

a valve means disposed within said discharge passage for adjusting the hydraulic pressure to be introduced into said hydraulic loads, said valve means defining a predetermined pressure difference between said pump side and said load side;

a displacement adjusting means cooperating with said variable displacement pump for adjusting displacement thereof depending upon its position, said displacement adjusting means being coupled with said first valve member at one end so as to be driven in a first direction depending upon variation of the hydraulic pressure at said pump side and being coupled with said second valve member at the other end so as to be driven in a second direction opposite to said first direction in response to variation of the hydraulic pressure at said load side, said displacement adjusting means being operated by said first and second valve means for adjusting displacement of said variable displacement pump to establish a force balance at said first and second valve members at a predetermined pressure difference; and an electrically operated actuator means cooperating with one of said first and second valve members and responsive to an electric command for performing inching operation of said work implement, for forcedly shifting the associated one of said first and second valve members to a predetermined shift position with an actuation force active for nominally reducing the pressure difference between said pump side and load side for operating said displacement adjusting means to reduce displacement of said variable displacement pump irrespective of the pressure difference between said pump and load sides.

8. A hydraulic circuit apparatus for supplying fluid under pressure into a plurality of hydraulic cylinders for a work implement, each cylinder having a different load pressure, arranged so as to connect a discharge passage of a variable displacement pump through operating valves with the cylinders for the work implement, said apparatus comprising:

a large diameter piston for actuating a displacement regulating member of said variable displacement pump in such a direction as to reduce the displacement of the pump;

a small diameter piston having a pressure receiving chamber connected with said discharge passage of the pump for actuating the displacement regulating member of said pump in such a direction so as to increase the displacement of the pump;

a load sensing valve for connecting or disconnecting the pressure receiving chamber of said large diameter piston with or from the discharge passage of said pump;

means for applying pushing forces to the load sensing valve so as to push its spool in such a direction as to selectively establish and block communication of the discharge passage of said pump with the pressure receiving chamber of said large diameter piston said pushing force applying means comprising:

a proportional position action electromagnetic solenoid provided on one side of said load sensing valve;

a mode change-over switch for the electromagnetic solenoid; and a controller adapted to receive an inching operation mode signal transmitted by the mode change over switch and send an electric current to said electromagnetic solenoid, wherein during normal operation of the work implement the flow rate of fluid discharged by the pump is controlled in such a manner that the difference between the discharge pressure of the pump and the load pressure is always kept constant, while during inching operation of the work implement the flow rate of the fluid discharged by the pump is reduced by an actuation force active on said large diameter piston for nominally reducing the pressure difference between said pump side and load side.

* * * * *